United States Patent [19]

Nace

[11] Patent Number: 4,657,949

[45] Date of Patent: Apr. 14, 1987

[54] GAMMA RADIATION RESISTANT CARBONATE POLYMER COMPOSITIONS WITH SORBATES

[75] Inventor: Vaughn M. Nace, Lake Jackson, Tex.

[73] Assignee: The Dow Chemical Company, Midland, Mich.

[21] Appl. No.: 805,003

[22] Filed: Dec. 5, 1985

[51] Int. Cl.$^4$ .............................. C08K 5/20; C08K 5/10
[52] U.S. Cl. .................................... 523/137; 524/230; 524/233; 524/306; 524/315; 524/317
[58] Field of Search ............... 523/137; 524/230, 233, 524/306, 315, 317

[56] References Cited

U.S. PATENT DOCUMENTS 3,186,961  6/1965  Sears ................................. 524/306

FOREIGN PATENT DOCUMENTS 0152012  8/1985  European Pat. Off. .

Primary Examiner—Lewis T. Jacobs
Attorney, Agent, or Firm—Benjamin G. Colley

[57] ABSTRACT

Carbonate polymer compositions are rendered gamma ray resistant by the incorporation of 5 to 20,000 ppm of one or more sorbate compounds. The compositions of the invention have a reduced yellowing after exposure to cobalt 60 radiation. Examples of useful sorbate compounds are sorbic acid, sorbic acid amides, esters and the like. The addition of hindered phenolic compounds renders the sorbate compounds more effective.

13 Claims, No Drawings

GAMMA RADIATION RESISTANT CARBONATE POLYMER COMPOSITIONS WITH SORBATES

BACKGROUND OF THE INVENTION

This invention relates to a gamma radiation resistant carbonate polymer composition wherein the polycarbonate polymer is rendered radiation resistant by the incorporation of an effective amount of one or more sorbate compounds.

There is a distinct need for polycarbonate moldings that are resistant to gamma radiation so that they can be sterilized without substantial loss of clarity and physical characteristics.

It is known that polyolefins can be rendered radiation resistant by the addition of benzhydrol, hydrocarbon oils, phthalic esters, and benzaldehyde acetals. See for example U.S. Pat. Nos. 4,431,497, 4,460,445; and 4,467,065.

It is also known that blends of polycarbonate resins and polyethylene terephthalate are resistant to gamma rays. Modern Plastics January 1984 page 104; Plastics World December 1983 pages 68 and 69.

SUMMARY OF THE INVENTION

The present invention is a carbonate polymer having improved gamma radiation stability due to the incorporation of one or more sorbate compounds in an amount sufficient or effective to improve the gamma radiation resistance.

The sorbate compounds used herein have the formula

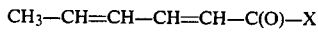

$$CH_3-CH=CH-CH=CH-C(O)-X$$

where X is a member of the group consisting of —OH, —NR$_1$R$_2$, —OR$_3$, —O—R$_4$—OH, and —O—R$_4$—OR$_5$ where R$_1$ and R$_2$ are hydrogen or a lower alkyl group of 1-4 carbons, R$_3$ is a hydrocarbon group of 1-18 carbons, R$_4$ is an alkylene group of 2-10 carbons, and R$_5$ is the sorbate radical.

In general, this effective amount has been found to be in the range from 5 to 20,000 parts per million. A preferred range is 500 to 15,000 ppm and the most preferred range is 2500 to 6,000 ppm.

DETAILED DESCRIPTION OF THE INVENTION

The carbonate polymers employed in the present invention are advantageously aromatic carbonate polymers such as the trityl diols carbonates described in U.S. Pat Nos. 3,036,036, 3,036,037, 3,036,038 and 3,036,039, polycarbonates of bis(ar-hydroxyphenyl)-alkylidenes (often called bisphenol-A type diols) including their aromatically and aliphatically substituted derivatives such as disclosed in U.S. Pat. Nos. 2,999,835, 3,038,365, and 3,334,154, and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121, 4,287,787, 4,156,069, 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The sorbate compounds used herein are either commercially available or can be readily prepared by known techniques.

It has been found that the radiation resistance of the carbonate polymers containing the sorbate compounds can be further improved by the addition of an effective amount of a hindered phenolic antioxidant compounds.

Examples of useful phenolic compounds are the following di-n-octadecyl(3-5-butyl-4-hydroxy-5-methyl-benzyl)malonate 2,6-di-t-butylphenol 2,2'-methylene-bis(6-t-butyl-4-methylphenol)

2,6-di-t-butylhydroquinone octadecyl-(3,5-di-t-butyl-4-hydroxybenzylthio)-acetate 1,1,3-tris(3-t-butyl-6-methyl-4-hydroxyphenyl)-butane 1,4-bis(3,5-di-t-butyl-4-yydroxybenzyl)-2,3,5,6-tetramethylbenzene 2,4-bis-(3,5-di-t-butyl-4-hydroxyphenoxy)-6-(n-octylthio)-1,3,5-triazine 2,4-bis-(4-hydroxy-3,5-di-t-butylphenoxy)-6-n-octylthioethylthio)-1,3,5-triazine 2,4-bis-(n-octylthio)-6-(3,5-di-t-butyl-4-hydroxyanilino)-1,3,5-triazine 2,4,6-tris-(4-hydroxy-3,5-di-t-butylphenoxy)-1,3,5-triazine n-octadecyl-3-3,5-di-t-butyl-4-hydroxyphenyl)-propionate n-octadecyl-3,5-di-t-butyl-4-hydroxybenzoate 2-(n-octylthio)ethyl-3,5-di-t-butyl-4-hydroxy-benzoate steramido N,N-bis-ethylene 3-(3,5-di-t-butyl-4-hydroxyphenyl)propionate 1,2-propylene glycol bis-3-(3,5-di-t-butyl-4-hydroxyphenyl)propionate pentaerythritol tetrakis-3-(3,5-di-t-butyl-4-hydroxyphenyl)propionate dioctadecyl-3,5-di-t-butyl-4-hydroxybenzylphosphonate di-n-octadecyl-1-(3,5-di-t-butyl-4-hydroxyphenyl)-ethanephosphonate The above phenolic hydrocarbon stabilizers are known and many are commercially available.

The amount of hindered phenol to be used herein is a variable factor dependent upon the type of carbonate polymer being used and the level of gamma radiation used. In general, an effective amount of the hindered phenol is an amount equal to the amount of sorbate compound being used. However, the weight ratio range of the hindered phenols to sorbate compound can be from 1 to 2 to 2:1.

The following examples are presented to illustrate but not limit the invention.

EXAMPLES 1-5

Six samples were prepared by adding various amounts of sorbic acid (2,4-hexadienoic acid) to polycarbonate resin pellets followed by agitation to disperse said additive. Each sample was then extruded and chopped on a 1.5 inch single-screw extruder. The resulting pellets were injection-molded to yield test discs of 2 inch diameter by ⅛ inch thick. Each sample is listed below along with the corresponding amounts of added sorbic acid, beginning yellowness index, and final yellowness index after exposure to 2.5 to 2.7 Mrad of Cobalt-60 gamma radiation. ASTM Yellowness Index Test D-1925 was used to measure the relative yellowing between the sample containing the additive and the control. The results are shown in Table I.

TABLE I

| SAMPLE | SORBIC ACID (ppm) | YI INITIAL | YI FINAL | Δ YI | % REDUCT. |
|---|---|---|---|---|---|
| Control 1 | 0 | 3.47 | 21.25 | 17.78 | |
| Ex. 1 | 500 | 3.32 | 14.50 | 11.18 | 37.1 |
| Ex. 2 | 1000 | 3.54 | 13.11 | 9.57 | 46.1 |
| Ex. 3 | 2000 | 3.65 | 11.41 | 7.76 | 56.4 |
| Ex. 4 | 3000 | 3.57 | 11.14 | 7.57 | 57.4 |
| Ex. 5 | 5000 | 3.88 | 11.39 | 7.51 | 57.8 |

EXAMPLES 6 AND 7

The stabilizing effect of sorbic acid against yellowing under gamma radiation conditions can be increased by supplementing the system with a hindered phenolic antioxidant; octadecyl 3-(3,5-di-t-butyl-4-hydroxyphenyl)propionate (Irganox 1076 from Ciba-Geigy). The compounding and fabrication steps for the controls and examples are identical to example 1. The samples were exposed to 3.0 to 3.3 Mrad of Cobalt-60 gamma radiation. The results are shown in Table II.

TABLE II

| SAMPLE | ADDITIVE(S) | PPM | YI INITIAL | YI FINAL | Δ YI | % REDUCT. |
|---|---|---|---|---|---|---|
| Control 2 | None | 0 | 4.54 | 26.95 | 22.41 | |
| Ex. 6 | Sorbic Acid | 2000 | 3.82 | 12.74 | 8.92 | 60.2 |
| Control 3 | Irganox 1076 | 2000 | 3.11 | 14.90 | 11.79 | 47.4 |
| Ex. 7 | Sorbic Acid/ Irganox 1076 | 2000/ 2000 | 3.17 | 10.72 | 7.55 | 66.3 |

The data in the table above indicates that the combination of sorbic acid and hindered phenolic antioxidant protects against yellowing better than the two used separately.

EXAMPLE 8

Six g of stearyl sorbate was added to 1994 g of polycarbonate pellets and the whole was turbulently shaken to effect dispersion of said ester onto the pellet surface. The sample was then extruded and molded as per the procedure in example 1. Optical discs after molding were exposed to 3.0 Mrad of gamma radiation and the change in yellowness index was measured. The results are shown in Table III.

EXAMPLE 9

The procedure of Example 8 was repeated using 4 grams of hexamethylene glycol disorbate and 2000 grams of polycarbonate pellets. The results are shown in Table III.

TABLE III

| ADDITIVE | PPM | YI INITIAL | YI FINAL | Δ YI | % REDUCT. |
|---|---|---|---|---|---|
| Control 4 | 0 | 3.23 | 28.44 | 25.21 | |
| Ex. 8 | 3000 | 4.14 | 17.57 | 13.43 | 46.7 |
| Control 5 | 0 | 4.29 | 25.83 | 21.54 | |
| Ex. 9 | 2000 | 13.06 | 23.23 | 10.17 | 52.8 |

We claim:

1. A carbonate polymer composition with improved resistance to gamma radiation which comprises a carbonate polymer and a gamma radiation resistance improving amount of one or more of the sorbate compounds having the formula $$CH_3-CH=CH-CH=CH-C(O)-X$$

where X is a member of the group consisting of $-OH$, $-NR_1R_2$, $-OR_3$, $-O-R_4-OH$, and $-O-R_4-OR_5$ where $R_1$ and $R_2$ are hydrogen or a lower alkyl group of 1-8 carbons, $R_3$ is a hydrocarbon group of 1-18 carbons, $R_4$ is an alkylene group of 2-10 carbons, and $R_5$ is the sorbate radical.

2. A carbonate composition as set forth in claim 1 wherein the amount of said compound is in the range from 5 to 20,000 parts per million.

3. The carbonate composition as set forth in claim 1 wherein X is OH.

4. The carbonate composition as set forth in claim 1 where X is $-OR_3$.

5. The carbonate composition is set forth in claim 1 wherein X is $-O-R_4-OR_5$.

6. The carbonate composition as set forth in claim 1 wherein the amount of said compound is in the range from 500 to 6000 parts per million.

7. The composition of claim 1 which contains in addition an effective amount of a hindered phenolic anti-oxidant.

8. The composition of claim 7 wherein said phenolic antioxidant is octadecyl 3-(3,5-ditertiary-butyl-4-hydroxyphenyl)propionate.

9. A carbonate polymer composition with improved resistance to gamma radiation which comprises a carbonate polymer and 5 to 20,000 parts per million of a sorbate compound selected from the group consisting of sorbic acid, stearyl sorbate, and hexamethylene glycol disorbate.

10. The composition of claim 9 wherein the range of sorbate compounds is in the range 2500 to 6000 parts per million.

11. The composition of claim 10 wherein the sorbate compound is sorbic acid.

12. The composition of claim 10 wherein the sorbate compound is stearyl sorbate.

13. The composition of claim 10 wherein the sorbate compound is hexamethylene glycol disorbate.

* * * * *